Aug. 17, 1937.   L. S. CHADWICK   2,090,107
ADJUSTABLE SHUTTER FOR ENCLOSED HEATERS OR THE LIKE
Original Filed June 13, 1934   6 Sheets-Sheet 1

INVENTOR.
Lee S. Chadwick
BY
Hull, Brock & West
ATTORNEYS.

Aug. 17, 1937. L. S. CHADWICK 2,090,107
ADJUSTABLE SHUTTER FOR ENCLOSED HEATERS OR THE LIKE
Original Filed June 13, 1934 6 Sheets-Sheet 3

INVENTOR.
Lee S. Chadwick
BY Hull, Brock & West
ATTORNEYS.

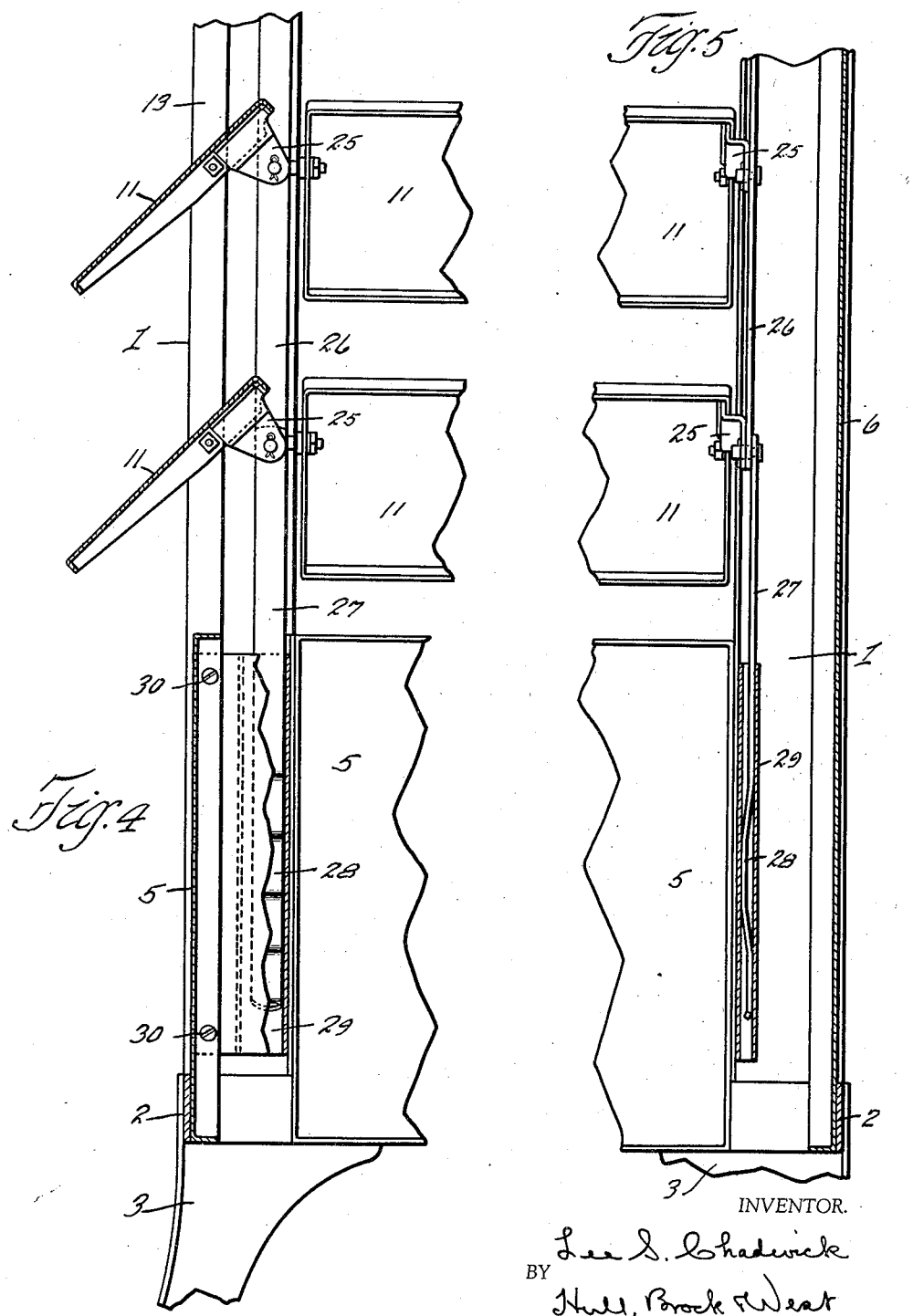

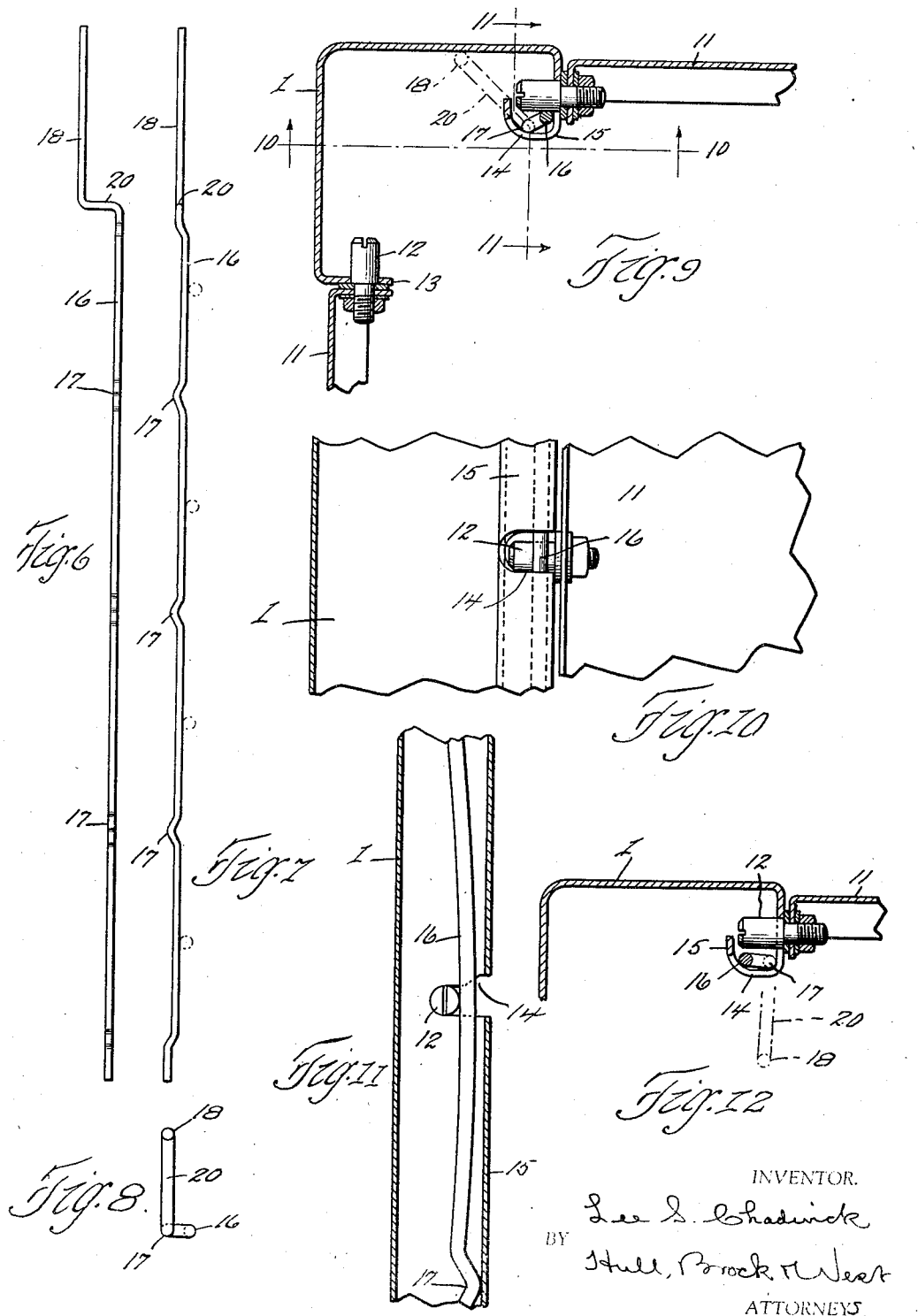

Aug. 17, 1937.  L. S. CHADWICK  2,090,107
ADJUSTABLE SHUTTER FOR ENCLOSED HEATERS OR THE LIKE
Original Filed June 13, 1934  6 Sheets-Sheet 6
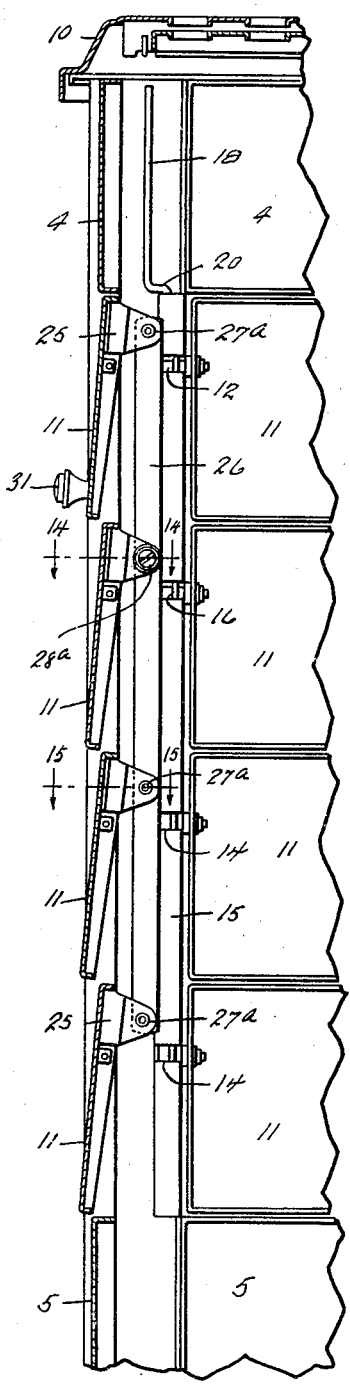
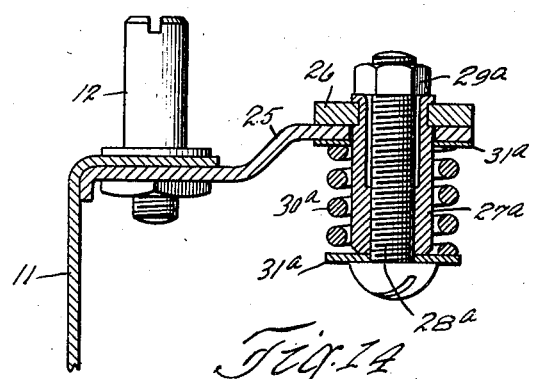
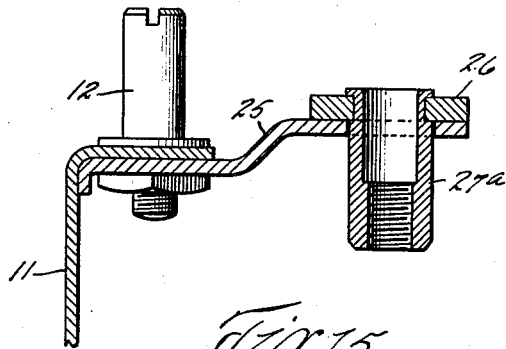
INVENTOR.
Lee S. Chadwick
BY Hull, Brock & West
ATTORNEYS.

Patented Aug. 17, 1937

2,090,107

UNITED STATES PATENT OFFICE 2,090,107

ADJUSTABLE SHUTTER FOR ENCLOSED HEATERS OR THE LIKE

Lee S. Chadwick, Shaker Heights, Ohio, assignor to Perfection Stove Company, Cleveland, Ohio, a corporation of Ohio Original application June 13, 1934, Serial No. 730,370. Divided and this application August 30, 1935, Serial No. 38,593

4 Claims. (Cl. 98—101)

This is a division of my former application Serial No. 730,370, filed June 13, 1934, now Patent No. 2,041,226, patented May 19, 1936, relating to a heating stove comprising generally, a heat radiating unit, a casing enclosing the same and having openings in its walls, and a series of adjustable shutters pivoted in each opening.

The present case is restricted to the invention pertaining to the shutters and having as its principal objects the provision of a form of mounting for the shutters that facilitates their emplacement and insures easy and satisfactory operation; the provision of means for effecting simultaneous operation of all shutters of a series, and the provision of a very simple contrivance, preferably frictional, for holding said shutters in any position to which they are adjusted.

Figure 1:
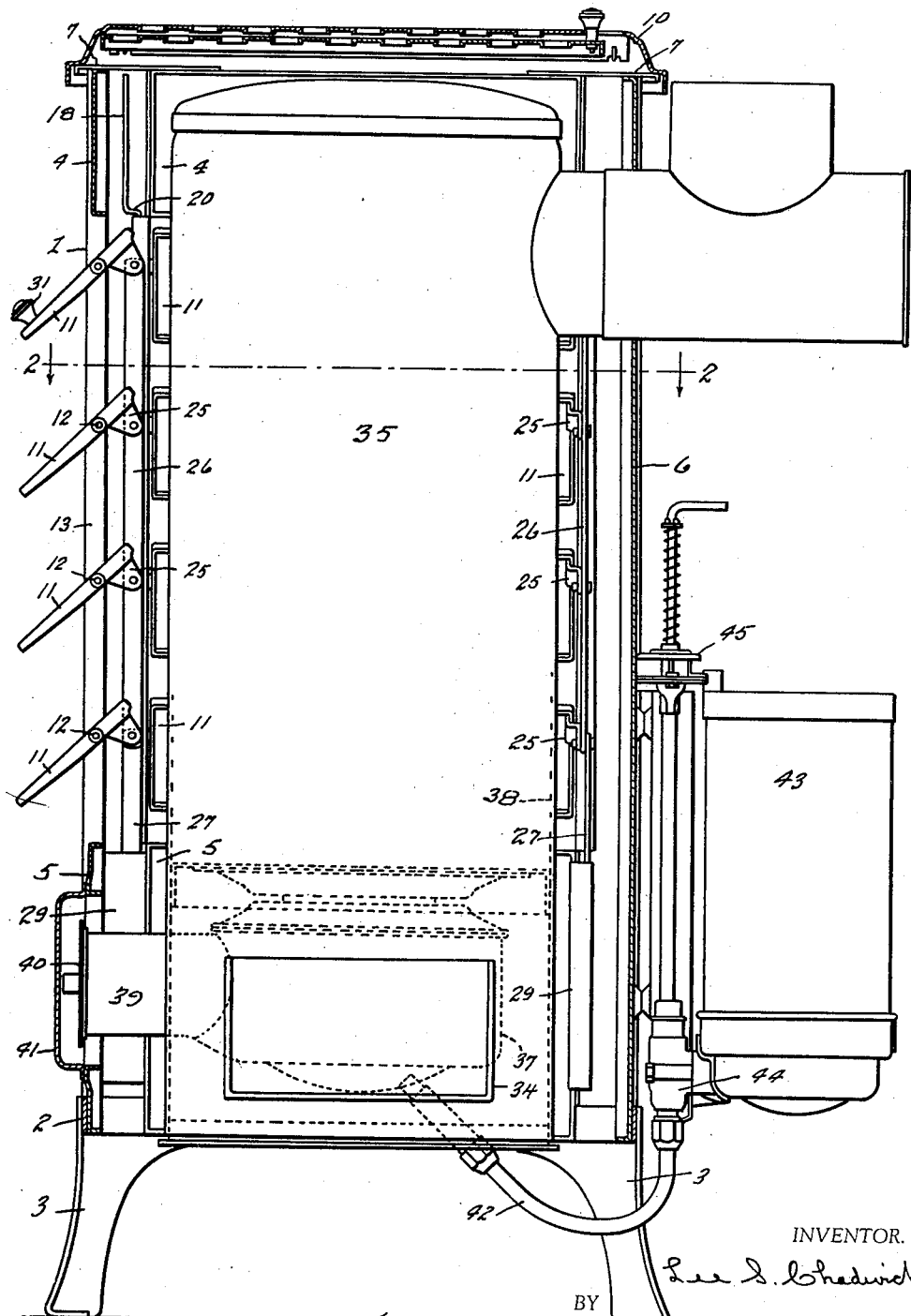
Figure 2:
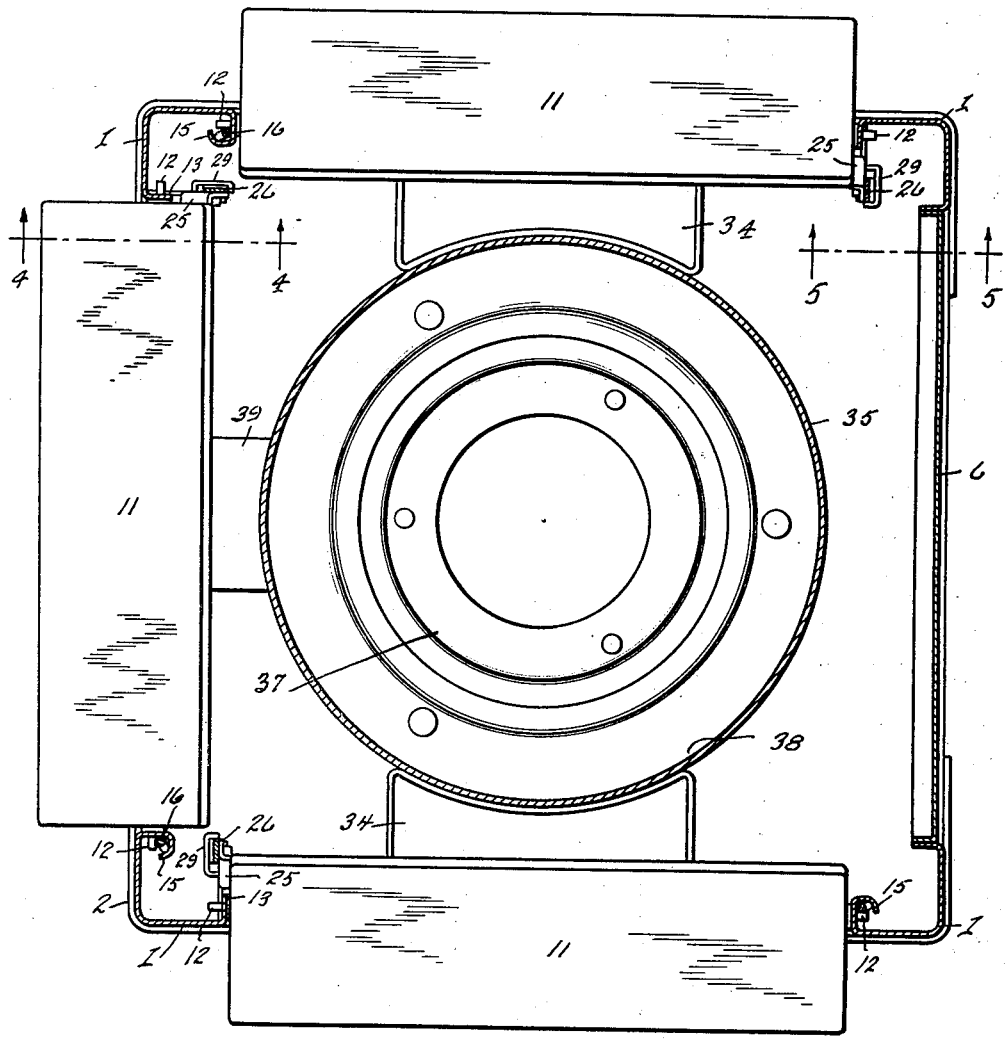
Figure 3:
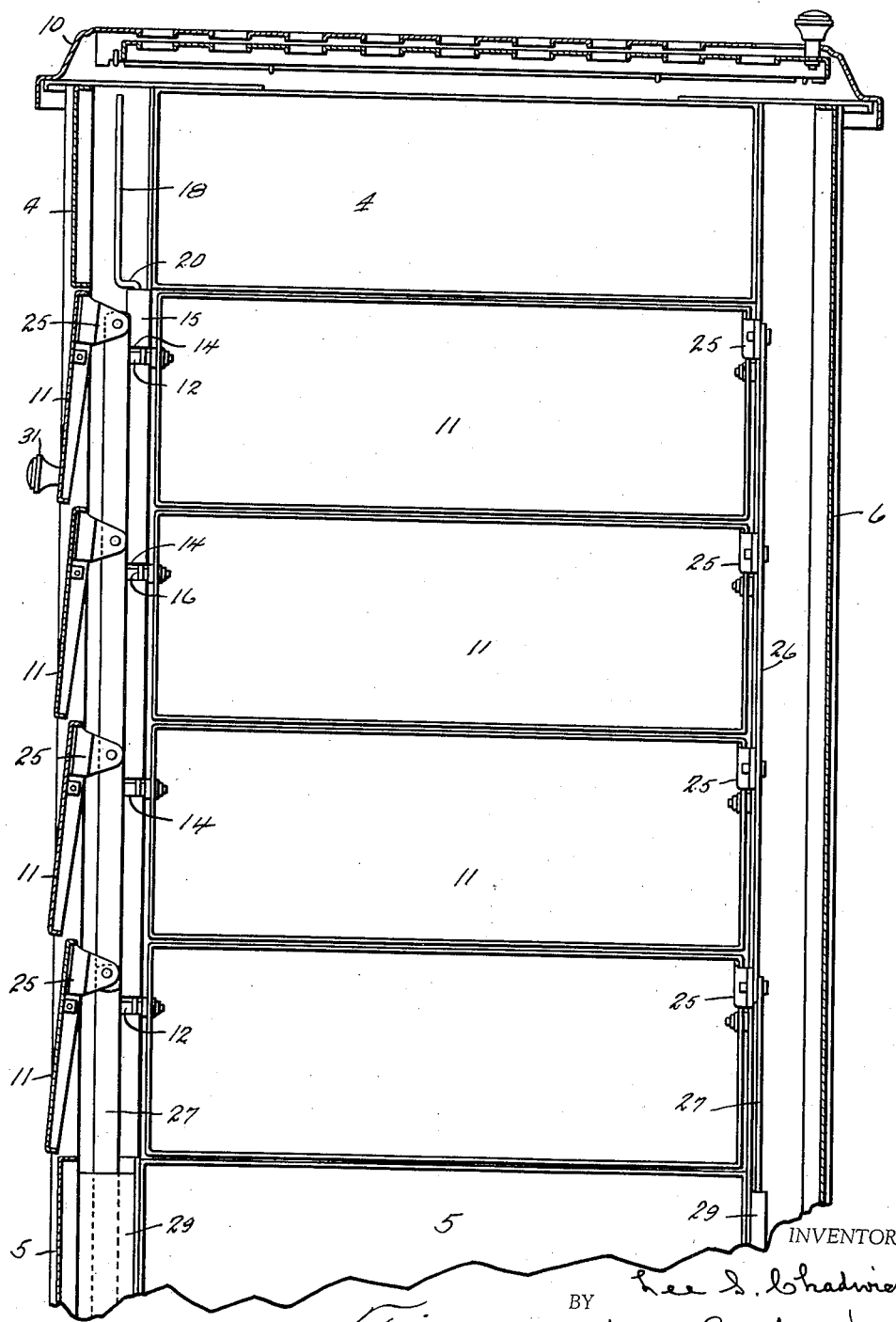

The foregoing objects, with others hereinafter appearing, are attained in the embodiment of the invention illustrated in the accompanying drawings wherein Fig. 1 is a vertical section, from front to rear, through heating apparatus incorporating the invention; Fig. 2 is a sectional plan on the line 2—2 of Fig. 1, the same being on a scale somewhat larger than that of the preceding view; Fig. 3 is a vertical section, from front to rear, through the casing of the apparatus, on the same scale as Fig. 2 and showing the shutters in closed position; Figs. 4 and 5 are sectional details, on a further enlarged scale, taken, respectively, on the lines 4—4 and 5—5 of Fig. 2; Figs. 6 and 7 are views at right angles to each other of a retaining member for the pivots at one end of the shutters of a series; Fig. 8 is a plan view of such member on a scale considerably enlarged over that of Figs. 6 and 7; Fig. 9 is a horizontal section through one of the front corners of the casing showing the pivotal mountings of adjacent front and side shutters; Figs. 10 and 11 are sections on the respective lines 10—10 and 11—11 of Fig. 9; Fig. 12 is a detail, similar to Fig. 9, showing the pivot retaining member in an ineffective position as when the parts are being assembled, and Figs. 13, 14 and 15 are details pertaining to the modification of the friction means for holding the shutters in any adjusted position.

The casing of the apparatus is made up of corner members or posts 1 of angular formation whose lower ends rest upon the corners of a rectangular frame 2 that is supported a suitable distance above the floor by legs 3. At the front and sides, stationary panels 4 are supported by and between the upper ends of the corner posts 1, and similar panels 5 are disposed between and are connected to the lower ends of said posts and project down inside, and are secured to, the frame 2. A wall 6 occupies the space between the posts 1 at the rear of the casing and extends from top to bottom thereof. Gussets 7 are suitably secured to the tops of the corner posts and overlie adjacent parts of the panels 4 and 6, the outer edges of the gussets being flanged downwardly and projecting a material distance beyond the outer surfaces of the posts. A top 10 surmounts the casing and is supported by and suitably attached to the gussets 7.

The lateral and front sides of the casing have openings defined by the corner posts 1 and the top and bottom panels 4 and 5, and within which opening is arranged a series of shutters 11. For the purpose of the present disclosure, the parts of the structure on opposite sides of, or surrounding each of the aforesaid openings may be considered a frame. Therefore, where the term "frame" is used in the claims it is intended to cover opposed supports for the shutters whether or not they are connected above and/or below the opening by cross members.

Each shutter 11 consists of a rectangular plate that is surrounded by a flange, and suitably secured to the end portion of the flange are pivot or bearing members 12. Said members, at one end of the shutters of each series (see Fig. 2), are engaged through bearing apertures in a straight inturned flange 13 of the adjacent corner post 1, while those of the opposite end are accommodated by notches 14 in a substantially L-shaped flange 15 of the contiguous corner post 1. As may best be seen from Figs. 9 to 12, the L-shaped flange 15 provides an inwardly facing channel downwardly through which may be projected a rod-like pivot retaining member or spring 16 (Figs. 6 to 8), having humps 17 spaced apart therealong. The top end of each member 16 is offset at 18, somewhat after the fashion of a crank, effecting a shoulder 20. It is evident from the corner post appearing in Figs. 1 and 3 that the laterally turned inner edge or channel portion of flange 15 terminates at its upper end about flush with the lower edge of the top panel 4 and at its lower end in the same relation to the upper edge of the bottom panel 5; and that the shoulder 20 of the retaining member 16 engages the upper end of said channel portion and serves as a stop to limit the downward movement of the pivot retaining member. It will also be apparent that the upwardly extending offset portion 18 of the retaining member is in a position to engage the gusset 7 thereabove and by reason of this arrangement each retaining member is held against upward displacement.

In the installation of the shutters, the pivot or bearing members 12 at one end are projected through the bearing apertures in the straight flanges 13 of one corner post and the shutters are then swung into place to engage the pivot or bearing members 12 at their opposite ends within the notches 14 of the flanges 15, it being observed from Fig. 11 that the inner ends of said notches are reduced in width to substantially the diameter of the pivot or bearing members. The pivot retaining member is next projected downwardly through the channel portion of the flange 15 in the position shown in Fig. 12 and, by means of the offset upper end 18, the member is turned to the position shown in Fig. 9, which causes the humps 17 to be swung about within the channel and force the portions of the member 16 between the humps into firm contact with the pivot or bearing members 12, the retaining member being somewhat deformed by this operation, as indicated in Fig. 11, wherefore it will be retained under tension and thus constantly impose a pressure upon the pivot or bearing members in a direction to force them into the restricted ends of the slots 14. When the pivot retaining member is in this position its offset end 18 is pressed against an adjacent part of the inner side of the post 1, as illustrated in broken lines in Fig. 9.

Arms 25 (Figs. 4 and 5) extend from the corresponding ends of the shutters 11 of each series, and the inner ends of these arms are offset laterally, as best shown in Fig. 5. A link 26 connects all arms of the shutters of a series, causing said shutters to operate in unison and, excepting in the modification illustrated in Figs. 13 to 15 which will hereinafter be described, a tongue 27 is pivotally joined to the arm of the lowest shutter, along with the lower end of the link 26, said tongue being offset laterally intermediate its ends, as shown at 28. The section of the tongue in the region of and including said offset portion is guided within a tubular member 29 that is secured, as by fastening means 30, to the flange 13 of the adjacent corner post. The tongue 27 is of resilient metal and, in the region of its offset portion 28, is somewhat compressed and thus placed under tension when forced into the tubular member 29. By this arrangement a frictional means is provided for holding the shutters in any position to which they are adjusted, and the adjustment may be made by grasping a knob 31 on the top shutter and swinging said shutter to the desired position, the others of the series assuming corresponding positions by reason of their connection with the top shutter through the arms 25 and link 26.

In the modification illustrated in Figs. 13, 14, and 15, the link 26 carries pivot members 27a, shown as tubular and as having their inner ends internally threaded and their outer ends reduced and engaged through holes in the link 26 and peened over therebeyond. The pivot members 27a are journaled in the bearing apertures of the arms 25 of the shutters. A bolt 28a is secured through next to the top bearing member 27a, according to the arrangement selected for illustrative purposes, and a nut 29a, that is applied to its outer end, locks the bolt against unscrewing. A spring 30a is compressed between washers 31a, one of which engages the head of the bolt and the other the arm 25. By means of this spring sufficient friction is created between the arm 25 and the link 26 to hold the shutters in any position to which they are adjusted. Obviously, if greater friction is desired, springs and bolts may be used with others of the pivot members. Also, excepting for manufacturing expedience, those pivot members with which bolts, springs, etc. are not used, might be sold.

Supported centrally within the casing, as by brackets 34, is a heat radiating unit 35 which, according to the present embodiment, consists of a cylindrical drum that encloses adjacent its lower end a firepot 37, shown in dotted lines, and a combustion chamber 38 thereabove. A neck 39 opens through and projects upwardly from the front wall of the firepot and provides a lighting and cleanout opening normally closed by a plug 40. The forward end of the neck extends through an opening in the front bottom panel 5 adapted to be covered by a closure 41 that is removably held in place by any suitable means.

Fuel is delivered by gravity through a conduit 42 from a fuel reservoir 43, and the flow of oil to the firepot is adapted to be controlled by a metering valve 44, in the conduit 42, which valve is equipped with an operating handle 45.

When the heat radiating unit or combustion device is in operation and the shutters 11 are open, heat will be radiated from the heat radiating unit or combustion device through the openings in the front and lateral sides of the casing, and by inclining the shutters the heat rays may be deflected downwardly toward the floor. When the shutters are closed, air will enter the bottom of the casing and rise through the duct between the casing and the heat radiating unit and escape through openings in the top 10. Obviously, by adjusting the different series of shutters at different angles various effects in heat distribution may be obtained.

Having thus described my invention, what I claim is:

1. The combination of a frame having an opening, a series of shutters within said opening, means pivotally connecting the shutters to the frame along one side of the opening, a flange extending along the opposite side of the opening, the inner portion of said flange being turned laterally away from the opening and flanged along its edge to form a channel, said inner portion of the flange having notches, pivots on the shutters journaled in said notches and projecting across the channel, and an elongated, resilient pivot retaining member projected lengthwise through the channel and engaging said pivots under tension for holding the pivots within the notches.

2. The combination of a frame having an opening, a series of shutters within said opening, means pivotally connecting the shutters to the frame along one side of the opening, a flange extending along the opposite side of the opening, the inner portion of said flange being turned laterally away from the opening and flanged along its edge to form a channel, said inner portion of the flange having notches, pivots on the shutters journaled in said notches and projecting across the channel, and an elongated resilient pivot retaining member projecting lengthwise through the channel, said member having offset bearing portions at intervals throughout its length which bear within a corner of the channel, and parts intermediate said bearing portions which engage the pivots and are placed under tension thereby for holding the pivots within the notches.

3. The combination of a frame having an opening, a series of shutters within said opening, means pivotally connecting the shutters to the frame along one side of the opening, a flange extending along the opposite side of the opening, the inner portion of said flange being turned laterally away from the opening and flanged along its edge to form a channel, said inner portion of the flange having notches, pivots on the shutters journaled in said notches and projecting across the channel, and an elongated resilient pivot retaining member projected lengthwise through the channel, said member having offset bearing portions at intervals throughout its length which bear within a corner between angularly related walls of the channel and having parts intermediate said bearing portions which engage the pivots and are placed under tension thereby for holding the pivots within the notches, the said notched inner portion of the flange stopping short of one end of the remaining portion of the flange and the pivot retaining member having a crank-like offset providing a shoulder that extends over the end of said inner portion and by means of which crank-like offset the pivot retaining member may be rotated within the channel to position said member as aforesaid and place said intermediate parts under tension, the crank-like offset of said member being retained in the position it assumes, when the member is rotated in the manner set forth, by engagement with a part associated with the frame.

4. In a frame and shutter construction, the combination of a frame part having bearing apertures, a series of shutters, pivots on the shutters journaled in said apertures, and a resilient member common to all of said pivots, the same having widely spaced bearing portions that engage parts fixed with respect to the frame and portions intermediate thereof that engage the pivots under tension thereby to constantly press the pivots laterally against the sides of the apertures and thus prevent rattle and compensate for wear of the pivotal parts.

LEE S. CHADWICK.